US 8,178,817 B2

(12) United States Patent
Stieglbauer et al.

(10) Patent No.: US 8,178,817 B2
(45) Date of Patent: May 15, 2012

(54) SPOT WELDING TONGS FOR ROBOTIC APPLICATIONS IN RESISTANCE WELDING OF WORKPIECES

(75) Inventors: Walter Stieglbauer, Manning (AT); Günter Weigerstorfer, Sipbachzell (AT)

(73) Assignee: Fronius International GmbH, Pettenbach (AT)

( * ) Notice: Subject to any disclaimer, the term of this patent is extended or adjusted under 35 U.S.C. 154(b) by 772 days.

(21) Appl. No.: 10/563,528

(22) PCT Filed: May 4, 2004

(86) PCT No.: PCT/AT2004/000151
§ 371 (c)(1),
(2), (4) Date: Jan. 3, 2006

(87) PCT Pub. No.: WO2005/002776
PCT Pub. Date: Jan. 13, 2005

(65) Prior Publication Data
US 2006/0163212 A1    Jul. 27, 2006

(30) Foreign Application Priority Data

Jul. 3, 2003    (AT) .................................. A 1023/2003

(51) Int. Cl.
*B23K 11/25*    (2006.01)
(52) U.S. Cl. .......... 219/119; 219/109; 219/110; 219/90; 219/86.1
(58) Field of Classification Search .............. 219/81, 219/82, 84, 86.1, 86.25, 91.1, 99, 117, 118, 219/119, 120, 109, 110
See application file for complete search history.

(56) References Cited

U.S. PATENT DOCUMENTS

| | | | |
|---|---|---|---|
| 2,678,367 A | | 5/1954 | Eisenburger |
| 3,430,027 A | * | 2/1969 | Denis .............................. 219/81 |
| 4,481,401 A | | 11/1984 | Humblot |
| 4,545,519 A | * | 10/1985 | Renshaw et al. ............... 228/1.1 |
| 4,684,778 A | | 8/1987 | Cecil |
| 5,811,750 A | * | 9/1998 | Caprioglio ...................... 219/81 |
| 5,961,854 A | | 10/1999 | Mueller et al. |

(Continued)

FOREIGN PATENT DOCUMENTS

DE        4416504        11/1995

(Continued)

OTHER PUBLICATIONS

Machine Translation of JP 05-192774, Obtained Nov. 25, 2008.*

(Continued)

*Primary Examiner* — Henry Yuen
*Assistant Examiner* — Brian Jennison
(74) *Attorney, Agent, or Firm* — Collard & Roe, P.C.

(57) ABSTRACT

Spot welding tongs for robotic applications in resistance welding of workpieces, in particular sheets, comprise tong arms, mounted such as to pivot on a base body. These tongs which may be adjusted and to which electrode holders for the electrodes are fixed and a winding device with a pay-out roller and a wind-in roller, for the winding in and out of a strip to protect at least one electrode. These spot welding tongs may be produced, in which access is not seriously affected and with a very simple and compact construction, whereby the pay-out roller and the wind-in roller of the winding device are arranged on the base body, or the tongs arm and at least one guide groove, for guiding the strip, is arranged in the tongs arm and/or the electrode holder.

21 Claims, 7 Drawing Sheets

U.S. PATENT DOCUMENTS

| | | | | |
|---|---|---|---|---|
| 7,012,213 B2 * | 3/2006 | Jeon | | 219/119 |
| 7,259,349 B2 * | 8/2007 | Stieglbauer et al. | | 219/109 |
| 2001/0045413 A1 * | 11/2001 | Suita | | 219/86.51 |

FOREIGN PATENT DOCUMENTS

| | | |
|---|---|---|
| DE | 19754546 | 6/1999 |
| DE | 19948043 | 4/2001 |
| EP | 0 391 551 | 10/1990 |
| GB | 571401 | 8/1945 |
| GB | 1559068 | 1/1980 |
| JP | 55141387 | 11/1980 |
| JP | 04322886 | 11/1992 |
| JP | 05192774 | 8/1993 |
| JP | 08118037 | 5/1996 |
| JP | 10029071 | 2/1998 |
| SU | 1206038 | 1/1986 |

OTHER PUBLICATIONS

Machine Translation of DE 44 165 04, Obtained Nov. 24, 2008.*
International Search Report.
International Search Report in PCT/AT2004/000151, Sep. 13, 2004.
International Preliminary Report on Patentability in PCT/AT2004/000151, May 18, 2006.

* cited by examiner

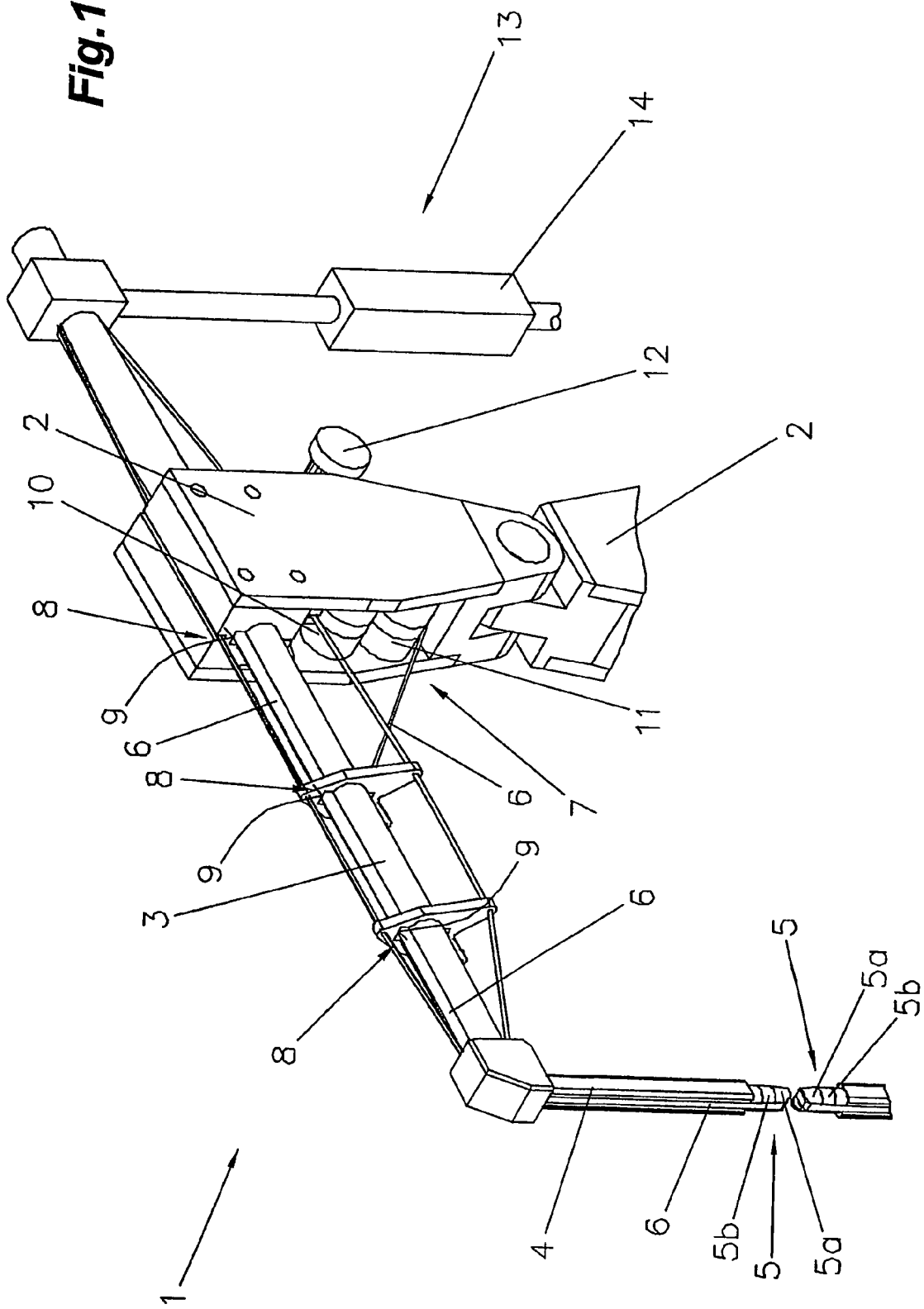

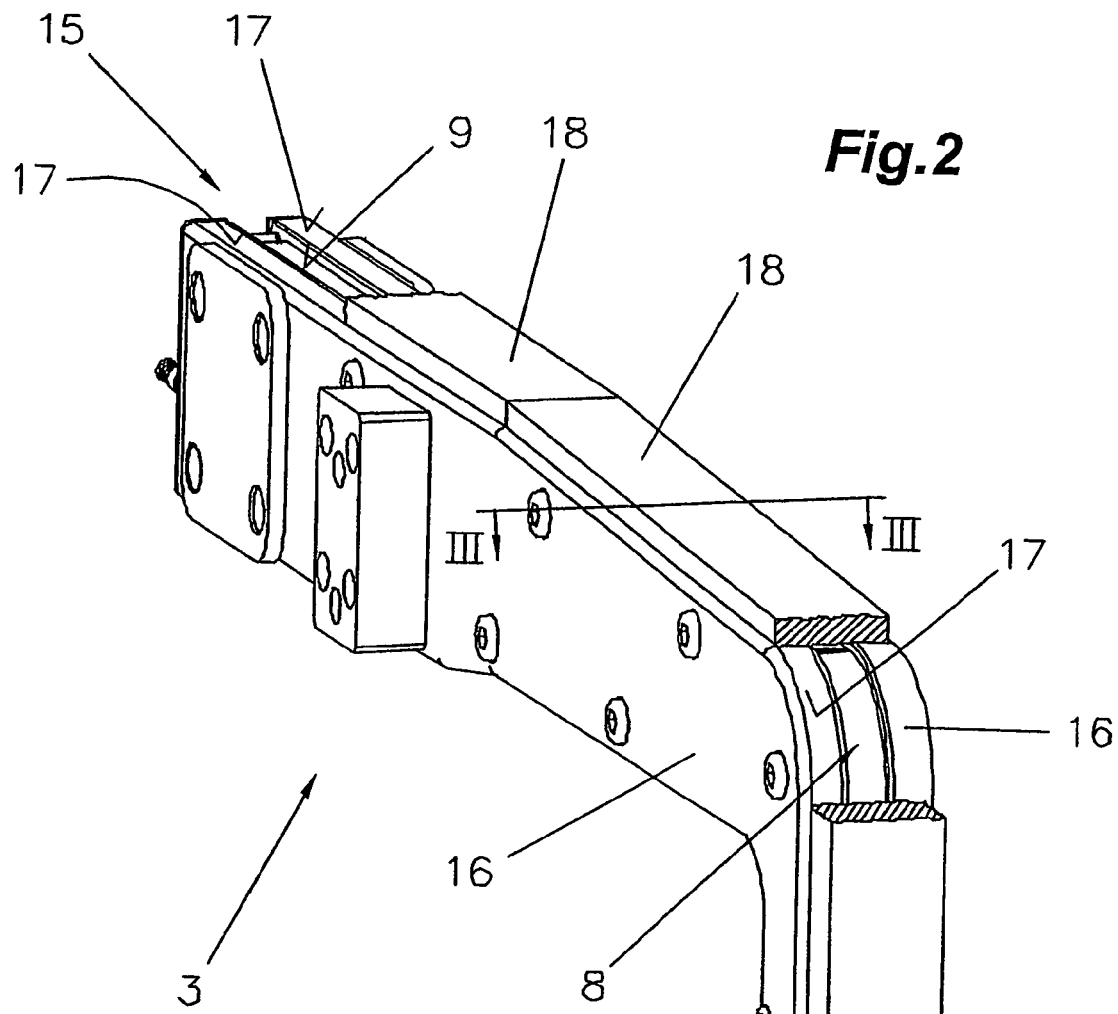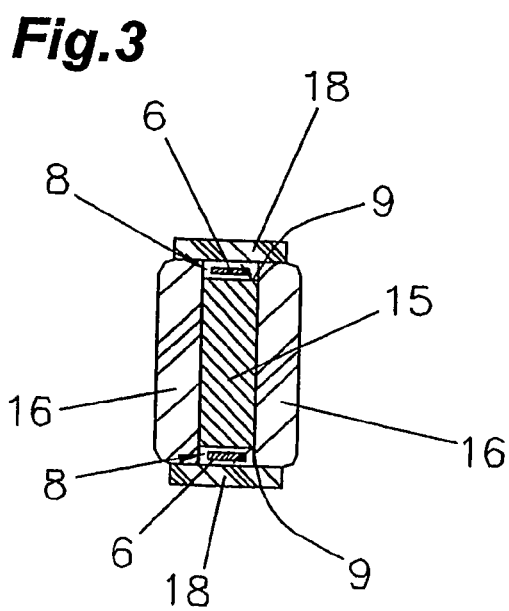

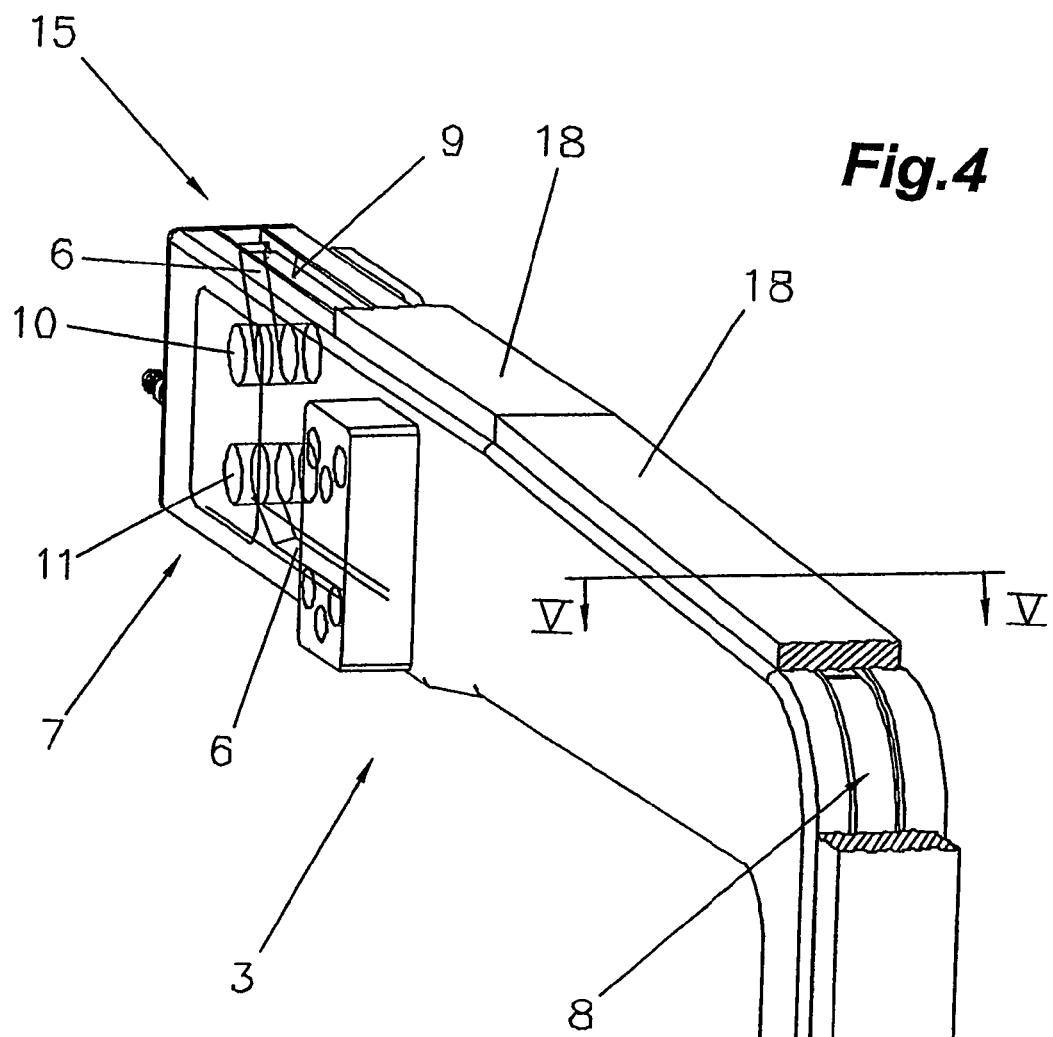
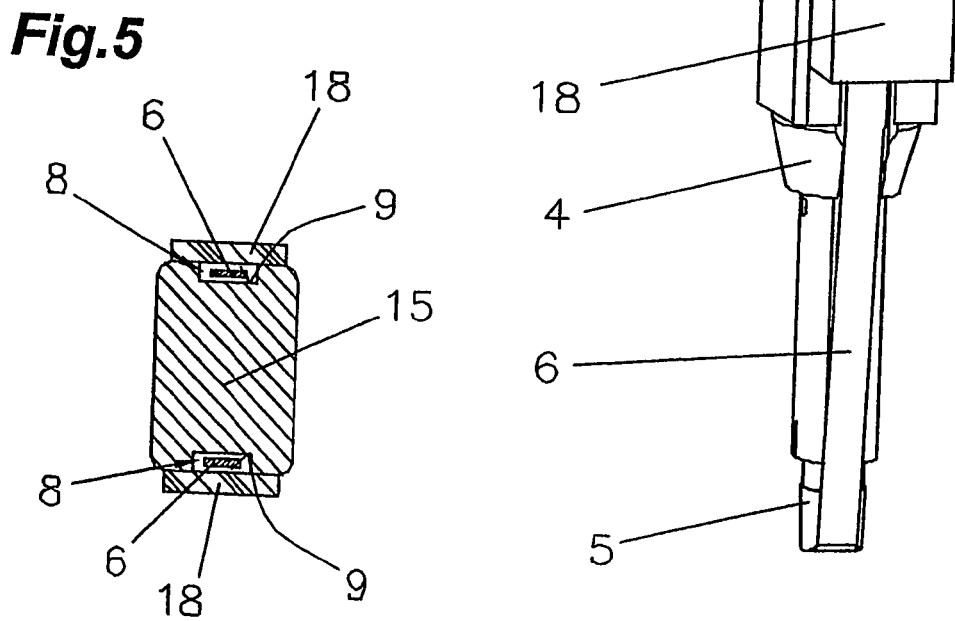

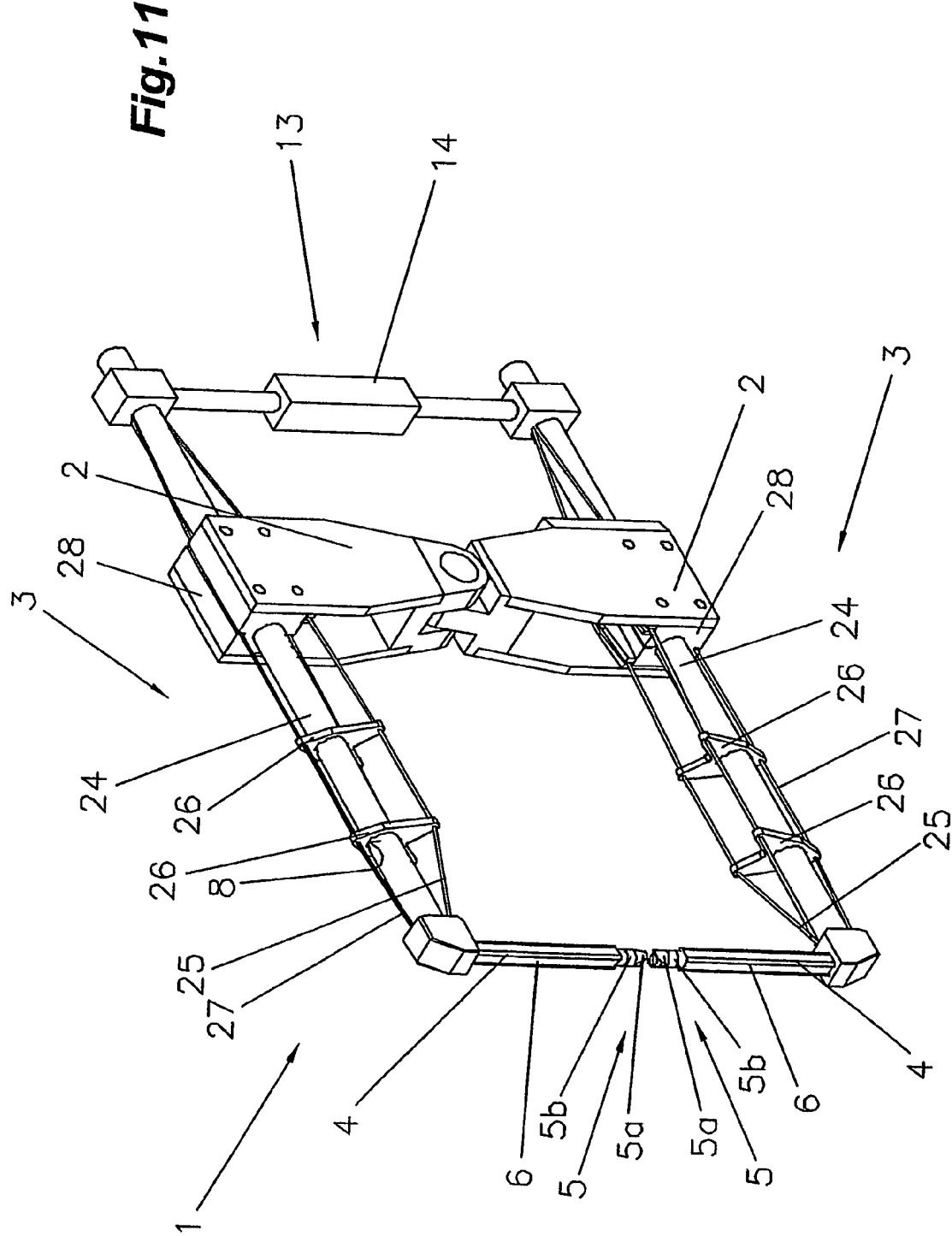

SPOT WELDING TONGS FOR ROBOTIC APPLICATIONS IN RESISTANCE WELDING OF WORKPIECES

CROSS REFERENCE TO RELATED APPLICATIONS

Applicants claim priority under 35 U.S.C. §119 of Austrian application No. A 1023/2003 filed Jul. 3, 2003. Applicants also claim priority under 35 U.S.C. §365 of PCT/AT2004/000151 filed May 4, 2004. The international application under PCT article 21(2) was not published in English.

The invention relates to spot welding tongs for robotic applications for the resistance welding of workpieces and, in particular, sheet metals, of the type including tong arms which are each pivotally mounted on a base body and adjustable by an actuating means and to which electrode holders for the electrodes are fastened, and further including winding means comprising a wind-off roller and a wind-up roller for winding off and on a strip for the protection of at least one electrode. The tong arms pivotally mounted on the base body are pivoted relative to each other in order to produce a spot weld and again pivoted away from each other after completion of said spot weld.

The invention further relates to spot welding tongs for robotic applications for the resistance welding of workpieces and, in particular, sheet metals, of the type including tong arms which are each pivotally mounted on a base body and adjustable by an actuating means and to which electrode holders for the electrodes are fastened.

From DE 197 54 546 C1, a spot welding tool comprising a winding device for winding on and off a film strip transversely contacting the electrode tip of the spot welding electrode is known. The spot welding tool is equipped with an annular wind-off coil for winding off the film strip and an annular wind-up coil for winding up the film strip, and comprises an annular driving means for the clocked rotation of the wind-up coil. The wind-off coil, the wind-up coil and the driving means are adjacently arranged, coaxially with one another, around the electrode shaft or electrode holder of the spot welding electrode. A first setting roller is arranged obliquely to the electrode shaft and at a radial distance from the wind-off coil to deflect the film strip from the wind-off coil towards the electrode tip and place it in a transverse position. Furthermore, a second setting roller is arranged obliquely to the electrode shaft and at a radial distance from the wind-up coil to deflect the film strip from the electrode tip towards the wind-up coil and place it in a transverse position, wherein the two setting rollers are arranged in an opposed relationship laterally of the electrode shaft.

A similar configuration is also known from JP 05 192 774, in which the wind-up and wind-off coils are likewise arranged on the electrode shaft or electrode holder, respectively.

The previously mentioned designs involve the disadvantage that the accessibility of the spot welding tool is strongly limited because of the arrangement of the wind-up and wind-off coils in the region of the electrode shaft or electrode holder, which calls for a substantial enlargement of the spot welding tongs in the end region and, in particular, in the welding zone. As a result, only easily accessible workpieces can be spot-welded by a spot welding tool of this type.

Other constructions of spot welding devices including strips for the protection of the electrodes are known from JP 10 029 071 A, JP 08 118 037 A, JP 04 322 886 A or JP 05 192 774 A. In those spot welding tools, the strip, which is supplied and discharged via a winding device, is positioned above the electrode, likewise as a protection against any contact of the electrode with the workpiece or structural component, so that the strip will contact the workpiece or structural component during a spot welding process. In doing so, the wind-up and wind-off coils are arranged and fixed independently of the spot welding tool.

U.S. Pat. No. 5,961,854 A discloses spot welding tongs including a winding device for winding on and off an electrode protection strip, yet no details can be taken as to the arrangement of the winding device and the course of the electrode protection strip. The spot welding tongs are relatively voluminous, thus affecting the accessibility of workpieces.

U.S. Pat. No. 4,481,401 A discloses spot welding tongs including winding means for winding on and off an electrode protection strip, with a ring being arranged upstream of the electrode for the guidance of the electrode protection strip. Yet, the strip extends at an angle relative to the tong arm from that ring to the winding device, for which reason relatively much space is required again.

SU 1 206 038 A discloses spot welding tongs in which the winding means for the electrode protection strip is fastened to the tong arm and carried at an angle of about 45° relative to the electrode. That arrangement requires an especially large space, for which reason those spot welding tongs are merely suitable for welding flat workpieces. Their use in the automated sector and, in particular, with welding robots is feasible only to a limited extent.

GB 571 401 A and JP 55141387 A too show spot welding tongs including winding means for electrode protection strips, which occupy relatively large spaces, for which reason an application with welding robots is practically impossible.

Finally, DE 199 48 043 A1 shows robot welding tongs according to the present application, yet does not disclose any winding means for winding on and off a strip for the protection of at least one electrode.

There, it is disadvantageous that a very large space is required such that the direct application is only feasible with flat workpieces. An automatic use, particularly with robots, is therefore not possible.

Another, very essential disadvantage of the above-mentioned prior art devices resides in that the strip is pulled over the electrode during conveyance, thus causing an elevated electrode wear on account of the friction occurring between the electrode and the strip.

The object of the present invention, therefore, resides in providing spot welding tongs for robotic applications for the resistance welding of workpieces, with which the accessibility is not substantially affected and a very simple and compact design of the spot welding tongs including an electrode protection strip is feasible. In addition, an exchange of the strip is to be feasible as simply and rapidly as possible.

According to another object of the present invention, the structure of the tong arm is to be as light-weight and compact as possible.

The first object of the invention is achieved in that the wind-off roller and the wind-up roller of the winding means are arranged on the base body or on the tong arm, and that at least one guiding groove is provided on the tong arm and/or on the electrode holder for the guidance of the strip along the tong arm.

According to another characteristic feature of the invention, it is provided that means for guiding and deflecting the strip, in particular deflection pulleys and slide surfaces, are provided on the tong arm and/or electrode holder.

The wind-off roller and/or the wind-up roller of the winding means is coupled with a driving means and, in particular, an electronically activatable motor.

If the tong arm is formed by a base section and side pieces are arranged on either side of the base section to project beyond the base section, and the thus formed depression is designed as a guiding groove for the strip, the manufacture of the tong arm will be simple.

If at least one cover plate is arranged on the end sides of the side pieces to cover the guiding groove formed between the side pieces, the guiding groove will be protected from foreign matter or possible spoiling.

It is also feasible to form the tong arm by a base section with a guiding groove being incorporated in the base section. In this case, the guiding groove is worked into the base section, for instance, by milling.

The retrofitting of existing spot welding tongs without major expenditures is feasible in that the guiding groove is formed by additional guiding elements which are provided, for instance slipped or screwed, on the tong arm and/or electrode holder.

A particularly simple variant embodiment is provided in that the tong arm is comprised of several individual components which are connected with one another in a manner that a hollow space is formed in the center of the tong arm for the guidance of the strip.

According to another characteristic feature of the invention, a braking device is provided to fix and stretch the strip, said braking device being preferably arranged in the region of the wind-off or wind-up roller to prevent the electrode protection strip from jamming and sagging.

If the braking device is connected with a control unit, a suitable control of the braking device is feasible.

The further object of the invention is achieved by above-described spot welding tongs in which the tong arms are each comprised of a main element which is prestressed by at least one drag strut or a drag rope. It is, thus, advantageously ensured that substantially simplified exchanges of the winding means as well as of the strip will be feasible due to the arrangement of the winding means within the base body or even on the tong arms. Another advantage is the substantially improved accessibility of the electrode holder and the electrode to complex workpieces or sheet metals, the latter being in fact be more easily reached due to the slim design of the electrode holder and electrode. In this context, it is advantageous that the main element of the tong arm can be substantially smaller dimensioned, since the major portion of the forces acting on the tong arm will be taken up by the prestressed drag struts or a drag rope.

Further configurations are described in subclaims 12 to 18. The resulting advantages may be taken from the description.

The present invention will be explained in more detail by way of the accompanying drawings.

Therein:

FIG. 1 is a perspective view of spot welding tongs according to the invention;

FIG. 2 is a perspective view of a tong arm of the spot welding tongs according to the invention;

FIG. 3 is a sectional illustration of the tong arm along the sectional line III-III of FIG. 2;

FIG. 4 is another perspective view of a tong arm of the spot welding tongs according to the invention;

FIG. 5 is again a sectional illustration of the tong arm shown in FIG. 4 along the sectional line V-V of FIG. 4;

FIGS. 10 and 11 are perspective views of the spot welding tongs according to the invention.

FIG. 1 depicts spot welding tongs 1 for robotic applications for the resistance welding of workpieces and, in particular, sheet metals in a perspective view, with only one half of the spot welding tongs being shown for reasons of clarity.

Figure 6:
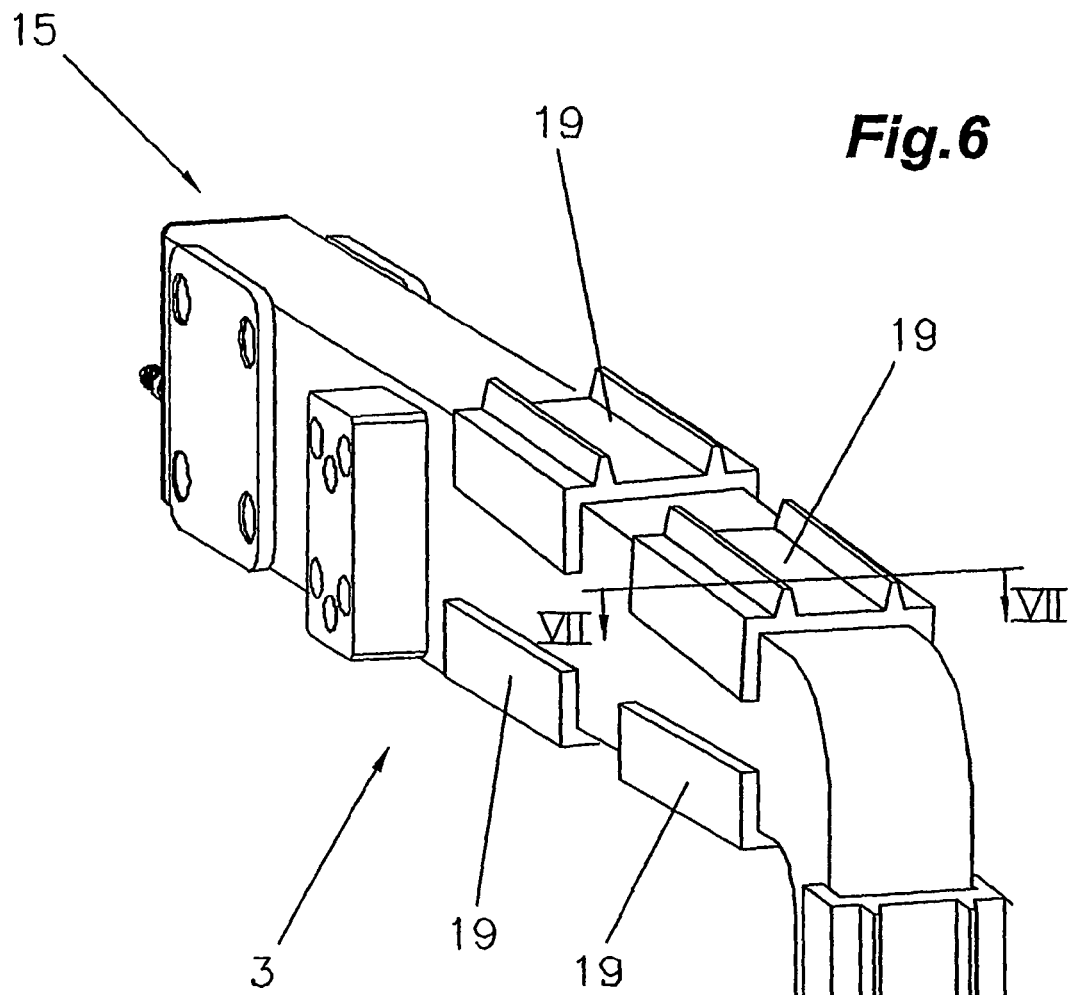
FIG. 6 is another perspective view of a tong arm of the spot welding tongs according to the invention.

The spot welding tongs 1 are comprised of base bodies 2 and tong arms 3 on which electrode holders 4 and electrodes 5 are arranged and around which circulating strips 6 run to protect the electrodes 5. The strip 6 is wound off a winding means 7 which may preferably be arranged on the base body 2, yet also on the tong arm 3, and is guided along the tong arm geometry over the tong arm 3, the electrode holder 4 and the electrode 5, and again back to the winding means 7 on the opposite side.

The electrode 5 is especially configured with a view to using the strip 6. Yet, it is, of course, also possible to use any electrode 5 known from the prior art. On the electrode 5, which is located in the interior of the assembly, a spacer 5*a* and a pressure element 5*b* are arranged in the region of an electrode cap so as to be movably connected with the electrode 5 in the longitudinal direction of the same, said pressure element 5*b* exerting a force on the spacer 5*a*. The spacer 5*a* and the pressure element 5*b* each comprise a guide for the strip 6 to enable the strip 6 to be kept at a distance from the electrode 5. The spacer 5*a* lifts the strip 6 off the electrode surface or electrode cap during or after the opening of the spot welding tongs 1, whereas the spacer 5*a* is pushed back during a welding process, i.e., with the spot welding tongs 1 closed, so as to cause the electrode 5 or electrode cap to contact the strip 6. In doing so, a pressure or force is additionally exerted on the work-piece or sheet metal by the spacer 5*a* on account of the pressure element 5*b* so as to prevent, for instance, the process-inherent bending or deflection of the sheet metals or structural components. When using such an electrode 5, or an electrode assembly of this type, it is ensured that the strip 6 does not directly contact the electrode cap with the spot welding tongs 1 opened, so that the strip 6 will be prevented from producing friction on the electrode 5 during its displacement, thus substantially increasing the service life of the electrode 5.

In order to enable the strip 6 to be brought near the electrode 5, means and, in particular, deflection pulleys and slide surfaces 9 are arranged on the tong arm 3 and/or on the electrode holder 4 to guide and deflect the strip 6. In doing so, the strip 6 extends from a wind-off roller 10 mounted within the winding means 7, via guiding grooves 8, or a channel, and the electrode holder 4 to the electrode 5, and from there again via the electrode holder 4 and guiding grooves 8, or a channel, to a wind-up roller 11, which is again arranged within the winding means 7. The wind-off roller 10 and/or the wind-up roller 11 are coupled with a driving means 12 and, in particular, an electronically activatable motor so as to enable the selective displacement of the strip 6 by the activation of said driving means 12.

The wind-off roller 10 and the wind-up roller 11 are designed with a view to enabling the simple and uncomplicated exchange or replacement of the rollers or the strip 6. To this end, the wind-off roller 10 and wind-up roller 11 are mounted in the base body 2, or in the tong arm 3, so as to be readily exchangeable, whereby automatic coupling to the driving means 12 is provided at a use of the wind-off roller 10 and/or the wind-up roller 11. By arranging the wind-off roller 10 and the wind-up roller 11 as well as the driving means 12 on the base body 2, or even on the tong arm 3, easier access to the coils will be ensured, thus rendering an exchange of the wind-off roller 10 and wind-up roller 11 substantially easier and simpler. Another positive effect of this arrangement of the wind-off roller 10 and wind-up roller 11 consists in that no interfering elements or parts will be present if the strip 6 is guided from behind, i.e., from the base body 2, to the electrode 5, which, as a result, allows for the nearly problem-free realization of a spot weld even on workpieces that are difficult to accede, because there is no limitation of accessibility as opposed to welding tongs having no strips 6. This configuration further enables the structural dimensions of the spot welding tongs 1 to be kept small.

For the sake of completeness, it is pointed out that the tong arms 3 are adjustably mounted and adjusted by an actuating means 13 which may, for instance, be comprised of a servomotor or a cylinder 14.

FIG. 2 depicts a tong arm 3 of spot welding tongs 1 in a perspective and schematically simplified view, and FIG. 3 is a sectional view of the tong arm 3 along the sectional line III-III of FIG. 2. The wind-off roller 10 and the wind-up roller 11 of the winding means 7 are arranged in the base body 2 (not illustrated), to which the tong arm 3 is fastened.

In this embodiment, the tong arm 3 of the spot welding tongs 1 is made of a base section 15 on which side pieces 16 are arranged on either side, which project beyond the base section 15 so as to form a depression, which serves as a guiding groove 8 for the strip 6. The side pieces 16 may be of aluminum, thus offering an enormous weight saving. Naturally, the side pieces 16 may be made of any other suitable material. The guiding groove 8 is designed in a manner that the surface along which the strip 6 runs serves as a slide surface 9.

On the end sides 17 of the side pieces 16 a cover plate 18 is preferably arranged to cover the guiding groove 8 formed between the side pieces 16. Thus, the strip 6 is not only better guided, but the strip 6 and the guiding groove 8 as well as the slide surface 9 are, moreover, protected from contaminations of any kind, since the strip 6 extends "in the open" only from the region of the electrode 5.

In FIGS. 4 and 5 a further embodiment of a tong arm 3 of spot welding tongs 1 is illustrated. The wind-off roller 10 and the wind-up roller 11 of the winding means 7 are in this case integrated in the tong arm 3. Furthermore, the guiding groove 8 is incorporated in the base section 15 of the tong arm 3, extending from the beginning of the tong arm 3, i.e. from the position of the wind-off roller 10 or wind-up roller 11, as far as to the electrode 5. The guiding groove 8 is preferably made by milling out of the base section. In doing so, the guiding groove 8 may again be covered by a cover plate 18. With such a construction, the tong arm 3 is comprised of few parts only.

Figure 7:
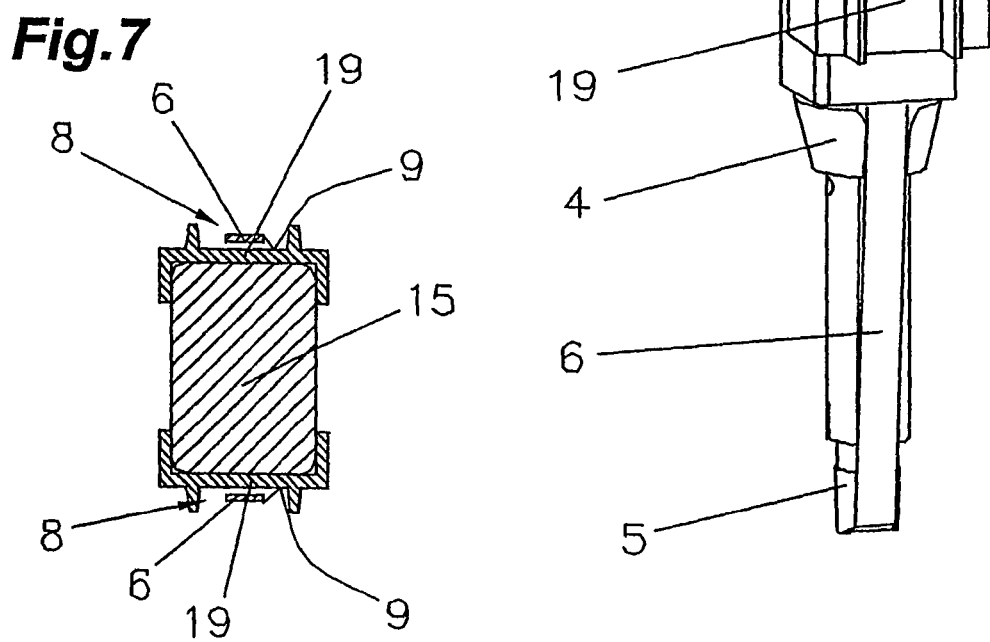
FIG. 7 is a sectional illustration of a tong arm along the sectional line VII-VII of FIG. 6.

Another exemplary embodiment is apparent from FIGS. 6 and 7. There, the guiding groove 8 is formed by additional guide elements 19 which are slipped or screwed on the tong arm 3 and/or the electrode holder 4. The guide elements 19 are, thus, designed as accessory components and fastened to the base section 15. This enables commercially available spot welding tongs 1 to be converted to belt systems without having to exchange or work the tong arms 3 and/or electrode holders 4. The guide elements 19 may be made of synthetic, but also any other materials.

The winding means 7, the wind-off roller 10 and the wind-up roller 11 may likewise be designed as accessory elements and subsequently mounted to the base body 2 or tong arm 3 in a simple form (not illustrated).

Figure 8:
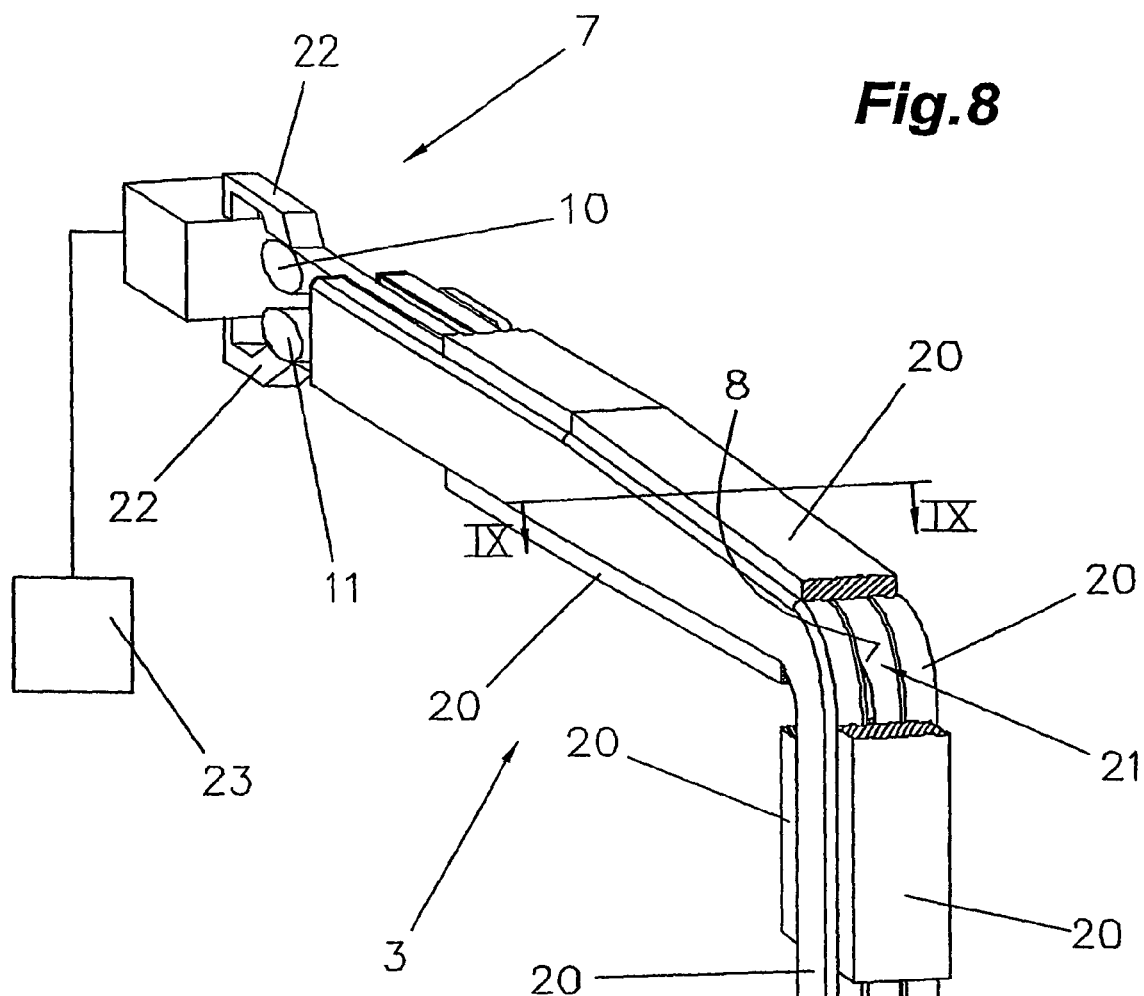
FIG. 8 is another perspective view of a tong arm of the spot welding tongs according to the invention.
Figure 9:
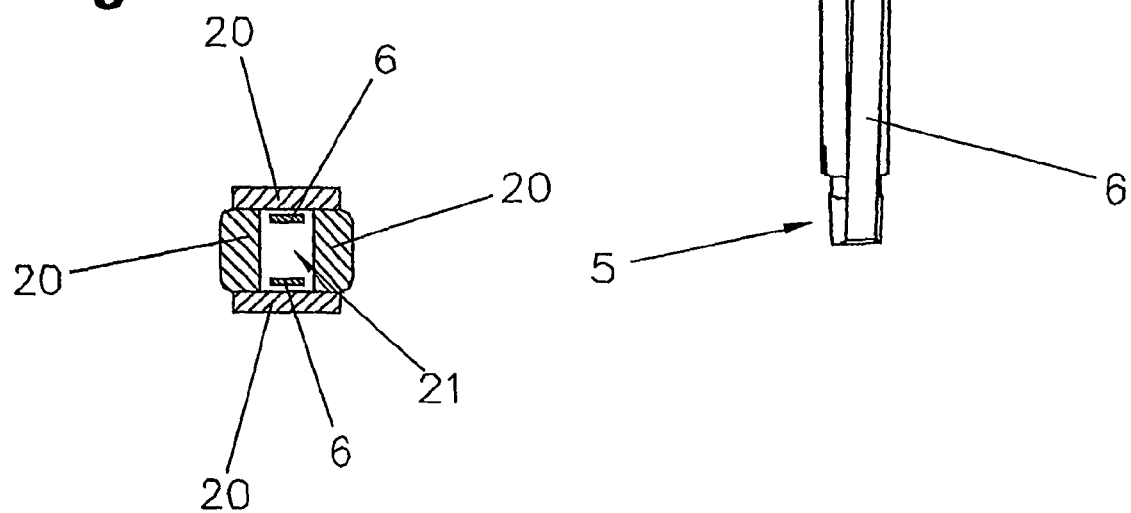
FIG. 9 is again a sectional illustration along the sectional line IX-IX of FIG. 8.

As in correspondence with FIGS. 8 and 9, the tong arm 3 may also be composed of several component parts 20 which are connected to form a hollow space 21 in the center of the tong arm 3 for the strip 6 to run therethrough. The component parts 20 may be screwed or plugged together. Naturally, the tong arm 3 may also be formed by a section tube on which incorporated guiding grooves 8 may be arranged both on the inner sides and on the outer sides of the section tube.

In a preferred manner, a braking device 22 for the strip 6 is provided in the region of the wind-off roller 10 and/or wind-up roller 11, which braking device is activated by a control unit 23 to keep the strip 6 taut. It is thereby prevented that the strip 6 gets jammed within the hollow space 21 or in the guiding groove 8, or sags loosely around. The braking device 22 may likewise be used in the previously described embodiments and is preferably integrated in the winding means 7. A detailed illustration has been omitted, since the design may be manifold. The braking device 22 might be formed by two relatively movable pressure elements between which the strip 6 is guided and which are moved onto the strip 6 with the braking device 22 activated, thus fixing the strip 6. The function of the braking device 22, therefore, resides in fixing the strip 6 after a continued movement of the same so as to keep the strip 6 always taut.

Figure 10:
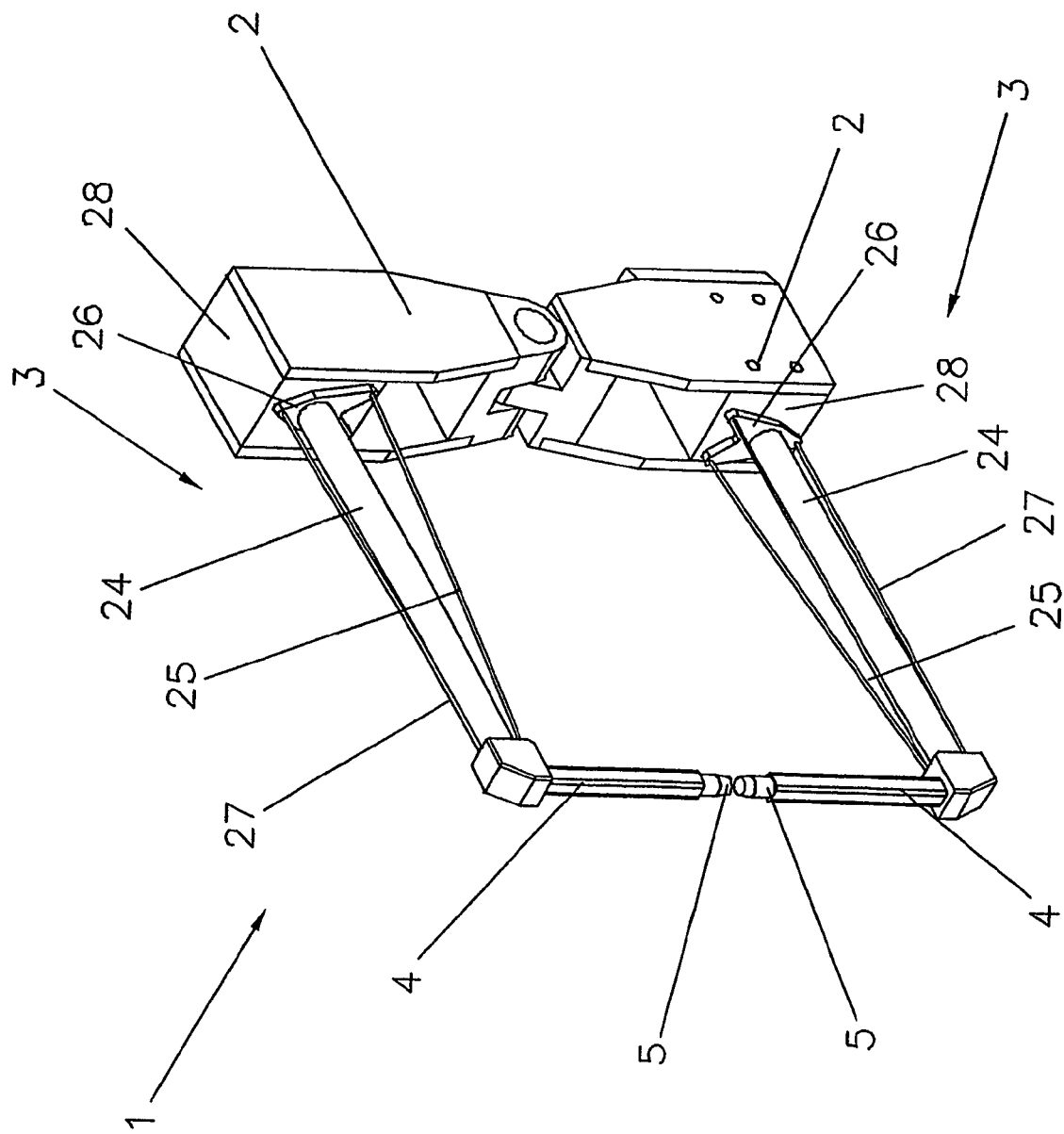

FIG. 10 perspectively illustrates spot welding tongs 1 for robotic applications for the resistance welding of workpieces and, in particular, sheet metals. Pivotally mounted tong arms 3 including electrode holders 4 for retaining electrodes 5 are again fastened to base bodies 2. The tong arms 3 are adjustable by the aid of an actuating means 13 (cf. FIG. 1). The actuating means 13 may be comprised of a servomotor or a cylinder 14 or any other possible actuating option.

In these spot welding tongs 1, a main element 24 is prestressed by at least one drag strut or a drag rope 25. The tong arm 3 may, for instance, be comprised of a main element 24 and at least one retaining plate 26 fastened to the main element 24. The main element 24 is preferably comprised of a round section. A drag strut or a drag rope 25 is fastened to one or several points of the retaining plate 26 and connected with the main element 24. The drag strut, or the drag rope 25, is fastened to that side of the main element 24, on which the electrode holder 4 extends. It is, furthermore, possible to arrange a holding strut, or a holding rope 27, on the opposite side of the drag strut or drag rope 25.

The tong arm 3 is connected with the base body 2 and, in particular, a reception element 28 via the retaining plate 26. It is, of course, also possible to do without a retaining plate 26 and connect the main element 24 as well as the drag rope 25, and optionally the holding rope 27, directly with the reception element 28. In doing so, it is essential that the drag rope 25 and the holding rope 27 are arranged on one side of the main element 24 in a spaced-apart relationship to the main element 24, and that both the drag rope 25 and the holding rope 27 are connected with the main element 24 or a fastening element (not illustrated) arranged on the main element. It is, thus, ensured that appropriate traction and holding forces are built up on the main element 24 of the tong arm 3 via the drag rope 25 and/or the holding rope 27. To this end, the drag strut or drag rope 25 and/or the holding strut, or holding rope 27, are arranged at an angle of, preferably, between 10° and 30° relative to the main element 24, which means that they extend at an angle relative to the surface of the main element 24 at least over a partial region. It is, in fact, possible that the drag rope 25 and/or the holding rope 17 are guided in parallel with the surface of the main element 24 over a partial region, while, however, extending angularly in the connection zone, as is, for instance, illustrated in FIG. 11.

Such a configuration of the tong arm 3 enables the main element 24 to have a very small cross section, since the pressure forces of the spot welding tongs 1 are taken up via the drag rope 25 and/or the holding rope 27. The weight of the spot welding tongs 1 will, thus, be considerably reduced as well.

FIG. 11 depicts another exemplary embodiment comprising such a tong arm system including ropes or struts. Here, the main element 24 of the tong arm 3 extends beyond the base body 2 of the spot welding tongs 1, whereby the tong arm is movably mounted within the base body 2, and the two base bodies 2 are mounted to be movable relative to each other. The tong arm 3 projects beyond the base body 2 on the side opposite to where the electrode holder 4 is fastened and is movably mounted in the base body 2 while forming a lever. The tong arm portion projecting beyond the base body 2 is connected with the actuating element 13. The actuating element 13 may be comprised of a cylinder 14. By displacing the cylinder 14, the tong arm 3 is displaced in a manner that the two electrodes 5 are pressed at each other and moved away from each other, respectively.

In the exemplary embodiment illustrated in FIG. 11, several holding plates 26 are arranged on the tong arm 3, particularly on the main element 24, to guide the drag rope 25 and the holding strut, or holding rope 27, in a spaced-apart manner. The drag rope 25 is fastened with the reception element 28 to the base body 2 and to the tong arm 3, whereas the holding rope 27 extends from the end region of the tong arm 3 with the electrode holder 4 to the opposite side of the base body 2 and, there, is connected with the tong arm 3. This is also feasible with the drag rope 25.

It is essential with such spot welding tongs 1 that the forces acting during the forcing together of the spot welding tongs 1 be taken up via the drag rope 25 and the holding rope 27 so as to enable the main element 24 to be substantially smaller dimensioned. A very substantial weight saving is, thus, achieved in a simple manner.

For the use of the strip 6 as a protection of the electrodes, the retaining plates 26 include appropriate openings which are, at the same time, used as a guiding groove 8 or channel. The wind-off roller 10 and the wind-up roller 11 may be integrated in the base body 2 (cf. FIG. 1).

The invention claimed is:

1. Spot welding tongs for robotic applications for the resistance welding of workpieces comprising:
   a base body;
   an actuating means;
   electrodes;
   electrode holders for holding said electrodes;
   a strip for protection of at least one of said electrodes;
   tong arms which are each pivotally mounted on said base body and adjustable by said actuating means and to which said electrode holders for said electrodes are fastened, and further including winding means comprising a wind-off roller and a wind-up roller coupled to at least one tong arm of said tong arms, said wind off roller and wind up roller for winding off and on said strip for the protection of at least one electrode of said electrodes, wherein the wind-off roller and the wind-up roller of the winding means are arranged on the base body or on at least one tong arm of said tong arms, and that at least one guiding groove comprising a recess is provided on said at least one tong arm and on the electrode holder for the guidance of the strip along said at least one tong arm;
   a pressure element arranged in a longitudinal direction with an electrode cap of at least one electrode of said electrodes; and
   a spacer coupled to said pressure element, said spacer disposed in a longitudinal direction with said electrode and configured to selectively space said strip from said at least one electrode, wherein said pressure element and said spacer comprise at least one guiding groove for guiding said strip around said at least one electrode wherein said spacer and said pressure element are configured to lift said strip from said at least one electrode during or after an opening of the spot welding tongs to protect said at least one electrode and wherein the spacer and the pressure element are movable relative to said at least one electrode of said electrodes.

2. Spot welding tongs according to claim 1, wherein means for guiding and deflecting the strip, in particular deflection pulleys and slide surface, are provided on said at least one tong arm or said at least one electrode holder.

3. Spot welding tongs according to claim 1, wherein said wind-off roller and/or the wind-up roller is coupled with a driving means and, in particular, an electronically activatable motor.

4. Spot welding tongs according to claim 1, wherein the section to project beyond the base section, and thus formed depression is designed as a guiding groove for the strip.

5. Spot welding tongs according to claim 4, wherein at least one cover plate is arranged on the end sides of the side pieces to cover the guiding groove formed between the side pieces.

6. Spot welding tongs according to claim 1, wherein the tong arm is formed by a base section with the guiding groove being incorporated in the base section.

7. Spot welding tongs according to claim 1, wherein the guiding groove is formed by additional guiding elements which are provided, for instance slipped or screwed, on the tong arm and/or electrode holder.

8. Spot welding tongs according to claim 1, wherein the tong arm is comprised of several individual components which are connected with one another in a manner that a hollow space is formed in the center of the tong arm for the guidance of the strip.

9. Spot welding tongs according to claim 1, wherein a braking device is provided to fix and stretch the strip.

10. Spot welding tongs according to claim 9, wherein the braking device is connected with a control unit.

11. Spot welding tongs comprising:
    tong arms;
    a base body wherein said tong arms are each pivotally mounted on said base body;
    an actuating means, wherein said tong arms are adjustable by said actuating means;
    electrode holders;
    electrodes wherein at least one electrode of said electrodes is fastened to at least one of said electrode holders and wherein at least one electrode has an electrode cap;
    a strip;
    a winding mechanism coupled to the base body, and comprising a wind-off roller and a wind-up roller for winding off and on said strip for the protection of at least one electrode of said electrodes wherein said wind-off roller and said wind-up roller of the winding mechanism are arranged on and coupled to said base body;
    at least one guiding groove comprising a recess disposed on at least one of said tong arms for a guidance of said strip along said at least one tong arm, and wherein said at least one guiding groove, extends onto at least one electrode holder of said electrode holders to guide said strip around said at least one electrode;
    a pressure element coupled to said electrode a; and
    a spacer coupled to said pressure element and movably coupled to said electrode, said spacer configured to selectively space said strip from said at least one electrode, wherein said pressure element and said spacer comprise at least one guiding groove for guiding said strip around said at least one electrode wherein said spacer and said pressure element are configured to lift said strip from said electrode during or after opening of the spot welding tong to protect said at least one electrode and are movable relative to said at least one electrode.

12. Spot welding tongs comprising:
a plurality of tong arms;
a base body wherein said plurality of tong arms are each pivotally mounted on said base body;
an actuator, wherein said plurality of tong arms are adjustable by said actuator;
a plurality of electrode holders;
a plurality of electrodes wherein at least one electrode of said plurality of electrodes is fastened to at least one of said plurality of electrode holders and wherein at least one electrode has an electrode cap;
a strip;
a winding mechanism coupled to the base body and comprising a wind-off roller and a wind-up roller for winding off and on said strip for the protection of at least one electrode of said plurality of electrodes wherein said wind-off roller and said wind-up roller of the winding mechanism are arranged on and coupled to said base body;
at least one guiding groove comprising a recess disposed on said electrode holder for the guidance of said strip and wherein said guiding groove extends on said plurality of tong arms to guide said strip on said tong arms;
at least one cover for covering said strip in said at least one guiding groove;
a pressure element arranged in the region of an electrode cap of the at least one electrode; and
a spacer coupled to said pressure element, said spacer configured to selectively space said strip from said electrode, wherein said pressure element and said spacer comprise at least one guiding groove for guiding said strip around said at least one electrode wherein said spacer and said pressure element are configured to lift said strip from said electrode during or after opening of the spot welding tong to protect said at least one electrode and are movable relative to said at least one electrode.

13. The spot welding tongs as in claim 1, further comprising:
a means for protecting electrodes comprising:
said pressure element arranged in the region of an electrode cap of the at least one electrode;
said spacer coupled to said pressure element, said spacer configured to space said strip from said electrode, wherein said pressure element and said spacer comprise at least one guiding groove for guiding said strip around said at least one electrode.

14. The spot welding tongs as in claim 11, further comprising:
a means for protecting said electrodes comprising:
said pressure element arranged in the region of an electrode cap of the at least one electrode;
said spacer coupled to said pressure element, said spacer configured to space said strip from said electrode, wherein said pressure element and said spacer comprise at least one guiding groove for guiding said strip around said at least one electrode.

15. The spot welding tongs as in claim 1, wherein said spacer is configured to lift said strip off of the electrode cap during or after the opening of the spot welding tongs and said spacer is configured to be pushed back during a welding process.

16. The spot welding tongs as in claim 11, wherein said spacer is configured to lift said strip off of the electrode cap during or after the opening of the spot welding tongs and said spacer is configured to be pushed back during a welding process.

17. The spot welding tongs as in claim 12, wherein said spacer is configured to lift said strip off of the electrode cap during or after the opening of the spot welding tongs and said spacer is configured to be pushed back during a welding process.

18. The spot welding tongs as in claim 12, wherein said actuator comprises a servomotor.

19. The spot welding tongs as in claim 12 wherein said actuator comprises a cylinder.

20. The spot welding tongs as in claim 11, wherein said spacer is movably coupled to said electrode in a longitudinal direction of said electrode.

21. The spot welding tongs as in claim 12, wherein said pressure element and said spacer are positioned along a longitudinal direction of said electrode.

* * * * *